(12) United States Patent
Wurbs et al.

(10) Patent No.: US 12,428,227 B2
(45) Date of Patent: Sep. 30, 2025

(54) METHOD FOR OPERATING A PRODUCTION SUPERMARKET, DEVICE FOR OPERATING A PRODUCTION SUPERMARKET, TROLLEY AND SYSTEM

(71) Applicant: Robert Bosch GmbH, Stuttgart (DE)

(72) Inventors: Alexander Wurbs, Kempten (DE); Jochen Kaercher, Schondorf (DE)

(73) Assignee: Robert Bosch GmbH, Stuttgart (DE)

(*) Notice: Subject to any disclaimer, the term of this patent is extended or adjusted under 35 U.S.C. 154(b) by 729 days.

(21) Appl. No.: 17/618,526

(22) PCT Filed: May 7, 2020

(86) PCT No.: PCT/EP2020/062725
§ 371 (c)(1),
(2) Date: Dec. 13, 2021

(87) PCT Pub. No.: WO2020/249330
PCT Pub. Date: Dec. 17, 2020

(65) Prior Publication Data
US 2022/0242666 A1 Aug. 4, 2022

(30) Foreign Application Priority Data

Jun. 14, 2019 (DE) ...................... 10 2019 208 672.1

(51) Int. Cl.
*B65G 1/04* (2006.01)
*B65G 1/06* (2006.01)
(Continued)

(52) U.S. Cl.
CPC ........... *B65G 1/0492* (2013.01); *B65G 1/065* (2013.01); *B65G 1/1373* (2013.01); *G06Q 10/087* (2013.01); *B65G 2203/046* (2013.01)

(58) Field of Classification Search
CPC .... B65G 1/0492; B65G 1/065; B65G 1/1373; B65G 2203/046; G06Q 10/087;
(Continued)

(56) References Cited

U.S. PATENT DOCUMENTS

2015/0028997 A1* 1/2015 Phillips ................. H04W 4/029
340/8.1
2018/0089616 A1* 3/2018 Jacobus ............... G05D 1/0274

FOREIGN PATENT DOCUMENTS

CN 102682620 A 9/2012
DE 19945052 A1 * 4/2001 ............ B65F 1/1484
(Continued)

OTHER PUBLICATIONS

DE19945052 description EN translation with paragraph numbers (Year: 2001).*
(Continued)

*Primary Examiner* — Jacob S. Scott
*Assistant Examiner* — Erin Morris
(74) *Attorney, Agent, or Firm* — Michael Best & Friedrich LLP

(57) ABSTRACT

The invention relates to a method for operating a production supermarket (100), wherein the method comprises the following steps: receiving a first allocation (Z1) of at least one production part type and a number of production parts to at least one of a plurality of containers (C); determining a second allocation (Z2) of at least one of the plurality of containers (C) to one of a plurality of track-bound trolleys (R); receiving a locating signal (LOC) coming from a terminal (D) connected to the trolley (R); determining a position (P) of the trolley (R) of the second allocation (Z2) according to the received locating signal (LOC); and providing the first allocation (Z1), the second allocation (Z2) and the position (P).

8 Claims, 2 Drawing Sheets

(51) Int. Cl.
*B65G 1/137* (2006.01)
*G06Q 10/087* (2023.01)

(58) Field of Classification Search
CPC .... G06Q 10/08; G06Q 10/0875; G06Q 50/04; G06Q 10/043; Y02P 90/30; G06K 7/10297
See application file for complete search history.

(56) References Cited

FOREIGN PATENT DOCUMENTS

| | | | |
|---|---|---|---|
| DE | 10223297 A1 * | 12/2003 | ........... G06Q 10/087 |
| DE | 102014205676 A1 | 10/2015 | |
| DE | 102016226062 A1 | 6/2018 | |
| DE | 102017120381 A1 | 3/2019 | |
| EP | 3471012 A1 | 4/2019 | |

OTHER PUBLICATIONS

DE10223297 description EN translation with paragraph numbers (Year: 2003).*
Translation of International Search Report for Application No. PCT/EP2020/062725 dated Jul. 21, 2020 (2 pages).
Chandrasekar et al., "Smart Shopping Cart with Automatic Billing System through RFID and ZigBee", International Conference on Information Communication and Embedded Systems, 2014, pp. 1-4.
Translation of National Intellectual Property Administration Peoples Republic of China Search Report for Application No. 202080043187.7 dated Feb. 26, 2025 (2 pages).

* cited by examiner

METHOD FOR OPERATING A PRODUCTION SUPERMARKET, DEVICE FOR OPERATING A PRODUCTION SUPERMARKET, TROLLEY AND SYSTEM

BACKGROUND OF THE INVENTION

The invention relates to a method for operating a production supermarket, a device for operating a production supermarket, and a trolley and a system.

It is known that the finished product or the components are stored in containers in a production supermarket. These containers are stacked on trolleys. The stock in the production supermarket is determinable by examining the containers and a paper card on the trolley.

SUMMARY OF THE INVENTION

A first aspect of this description relates to a method for operating a production supermarket. The method comprises: receiving a first allocation of at least one production part type and a number of production parts to at least one of a plurality of containers; determining a second allocation of at least one of the plurality of containers to one of a plurality of floor-bound trolleys; receiving a locating signal emanating from a terminal device connected to the trolley; determining a position of the trolley of the second allocation depending on the received locating signal; and is providing the first allocation, the second allocation and the position.

The production parts stored in the containers and their quantity or number are inventoriable and precisely locatable at any time in the production plant and adjoining logistics by means of the provided data. Precise details of every item stocked in the production supermarket are therefore available. Tasks such as, for example, ordering of goods in the pre-assemblies, from external suppliers or in data systems, such as, for example, integrated standard business software packages, can further be automated. Replacement times can be determined empirically.

A further advantage is achieved in that the production parts stored in the containers and their position are precisely monitored. The transit time of a production part through production can thus be measured. The current status of the supermarket can be used for automated production control of the value stream. The real-time data thus obtained form the basis for system optimization and mapping.

In addition, the aforementioned advantages are achieved at low cost, since the necessary technical components, such as, for example, the terminal device, can be provided at low cost. The method therefore represents a contribution to increasing transparency and simultaneously a contribution to cost reduction in manufacturing.

One advantageous example is characterized in that the determination of the second allocation comprises: passing through a pairing area by means of the trolley; determining an identifier of the trolley which is located in the pairing area; capturing a plurality of identifiers of the containers which are disposed on the trolley passing through the pairing area; and providing the second allocation comprising the determined identifier of the trolley and the plurality of determined identifiers of the containers.

This form of determination of the second allocation is, on the one hand, easily performable by pushing the trolleys equipped with the containers, for example manually, through the pairing area. On the other hand, a one-off determination of the second allocation can suffice, since the parts in the containers are then fed to production. The production parts are stored in the containers on the trolleys until they are used.

One advantageous example is characterized in that the identifier of the trolley is determined in the pairing area depending on the locating signal.

The location function which is provided, inter alia, by means of the terminal device of the trolley is therefore already advantageously used in determining the second allocation.

One advantageous example is characterized in that each of the plurality of containers is equipped with a respective RFID transponder, wherein the respective identifier of the containers located on the trolley is captured by means of an RFID reading device in the pairing area.

A low-cost solution is advantageously provided for determining the second allocation in the pairing area.

One advantageous example of the method comprises: determining a row in the production supermarket depending on the position; and providing the first allocation, the second allocation and the row.

A user of the production supermarket can thus, for example, advantageously easily recognize which trolley he must remove from which row.

A second aspect of this description relates to a device for operating a production supermarket, wherein the device comprises a processor, a memory with computer program code, a communication module and an antenna, wherein the computer program code is configured in such a way that, together with the processor, the communication module and the antenna, it has the effect that the device receives a first allocation of at least one production part type and a number of production parts to at least one of a plurality of containers; determines a second allocation of at least one of the plurality of containers to one of a plurality of floor-bound trolleys; receives a locating signal emanating from a terminal device connected to the trolley; determines a position of the trolley of the second allocation depending on the received locating signal; and provides the first allocation, the second allocation and the position.

A third aspect of this description relates to a floor-bound trolley, preferably equipped without a drive, for a production supermarket, wherein the trolley comprises: a plurality of non-driven wheels; an accommodation section for accommodating containers; a wireless terminal device which comprises at least one communication module and at least one antenna, and which is designed to transmit a locating signal for determining a position of the trolley.

A fourth aspect of this description relates to a system comprising the device according to the second aspect and a plurality of floor-bound trolleys according to the third aspect.

DETAILED DESCRIPTION

Figure 1:
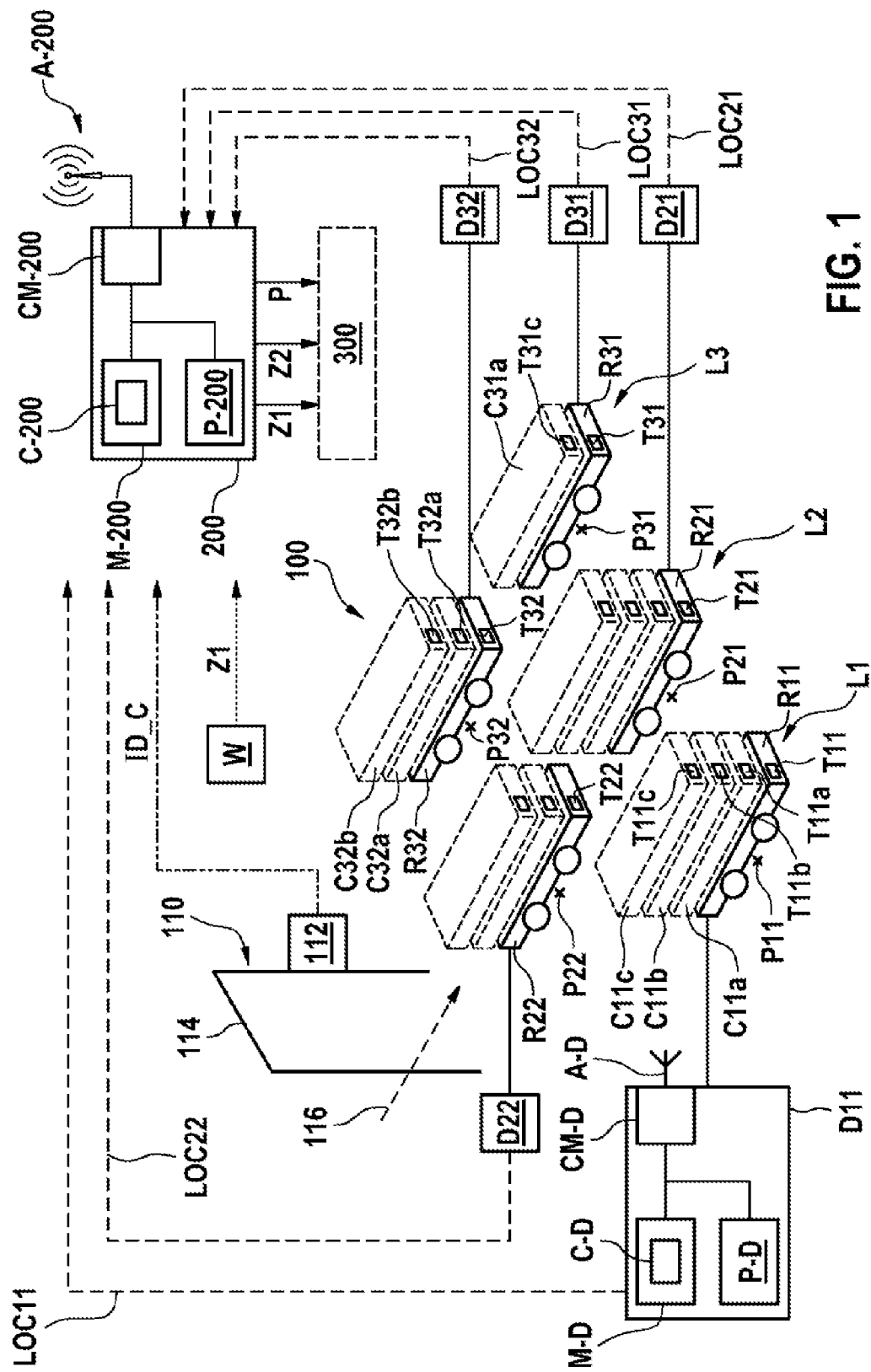
FIG. 1 shows a production supermarket in schematic form.

FIG. 1 shows a production supermarket 100 in schematic form. A system for operating the production supermarket of a plant comprises a plurality of floor-bound, preferably non-driven, trolleys R11-R32 and a device 200.

The device 200 for operating the production supermarket 100 comprises at least one processor P-200, at least one memory M-200 with computer program code C-200, at least one communication module CM-200 and at least one antenna A-200. The computer program code C-200 is configured in such a way that, together with the at least one processor P-200, the at least one communication module CM-200 and the least one antenna A-200, it carries out the methods described in this description.

Containers C11a-C32b are supplied from a different plant W or a pre-assembly or preproduction, and first allocations Z1 are also provided. One of these first allocations Z1 comprises at least one production part type and/or a number of production parts to at least one of the containers C which are supplied or are to be supplied. The first allocation Z1 is received by the device 200.

Alternatively, the first allocation Z1 can also be captured manually, wherein a supplementary sheet having a QR code, barcode, etc., is enclosed with the respective stocked container C. The first allocation Z1 is provided by scanning the supplementary sheet and by capturing an identifier of the container C, and is received by the device 200.

The production supermarket 100 comprises, for example, rows L1 to L3 in which the trolleys R are arranged with the containers C disposed thereon.

A second allocation Z2 of at least one of the plurality of containers C to one of a plurality of floor-bound trolleys R is determined in a pairing area 110. An RFID gateway 114 defines, for example, this pairing area 110.

The determination of the second allocation Z2 therefore comprises, for example, a manual passing through the pairing area 110, in particular the RFID gateway 114, by means of the trolley R. An identifier of the trolley R which is located in the pairing area 110 is determined. A plurality of identifiers of the containers C which are arranged on the trolley R passing through the RFID gateway 114 according to an arrow 116 are determined. The second allocation Z2 comprises the determined identifier of the trolley and the plurality of determined identifiers of the containers C.

The identifier of the trolley R is determined in the pairing area 110 depending on a locating signal LOC. Alternatively or additionally, a respective RFID transponder T11 to T32 which is read in the area of the RFID gateway 114 and serves to determine the second allocation Z2 is arranged on the trolley.

Each of the plurality of containers C is equipped with a respective RFID transponder T. The containers C11a, C11b, C11c located on the trolley R11 are equipped, for example, with a respective RFID transponder T11a, T11b, T11c. The respective RFID transponder T is, for example, glued onto the associated container C or is disposed invisibly in a material of the container C. The capture of the respective identifier of the container C located on the trolley R is therefore determined by means of an RFID reading device 112 in the pairing area 110. The reading device 112 transmits the identifiers ID_C of the containers C in the pairing area 110 to the device 200.

The locating signals LOC11 to LOC32 are transmitted by terminal devices D11 to D32 which are connected to the trolley R11 to R32 and are received by the device 200. In the simplest case, the locating signal LOC can comprise a signal comprising an identifier of the trolley R11 to R32. The locating signal LOC is received, for example, by at least three antennas of the device 200 which are spaced apart from one another, wherein a position P11 to P32 of the respective trolley R11 to R32 is determined by means of a triangulation. The position P of the trolley R of the second allocation Z2 is then determined depending on the received locating signal LOC. Other locating methods are obviously also applicable.

A respective terminal device of the terminal devices D11 to D32 comprises at least one processor P-D, at least one memory M-D with computer program code C-D, at least one communication module CM-D and at least one antenna A-D. The computer program code C-D is configured in such a way that, together with the at least one processor P-D, the at least one communication module CM-D and the at least one antenna A-D, it carries out the methods described in this description. The respective terminal device D communicates, for example according to the 5G standard, with the device 200.

A respective terminal device of the terminal devices D11 to D32 comprises an accumulator (not shown). In a form not shown, the tracks of the supermarket comprise charging rails for charging the accumulator. On travelling over or parking on one of the charging rails, the respective accumulators of the terminal devices D11 to D32 are preferably inductively charged.

The first allocation Z1, the second allocation Z2 and the position P are provided by the device 200, for example to a production control system 300.

The respective floor-bound trolley R for a production supermarket 100 comprises a plurality of non-driven wheels, an accommodation section for accommodating the containers C, and the wireless terminal device D which comprises at least one communication module CM-D and at least one antenna A-D, and which is designed to transmit the locating signal LOC for determining the position P of the trolley R.

Figure 2:
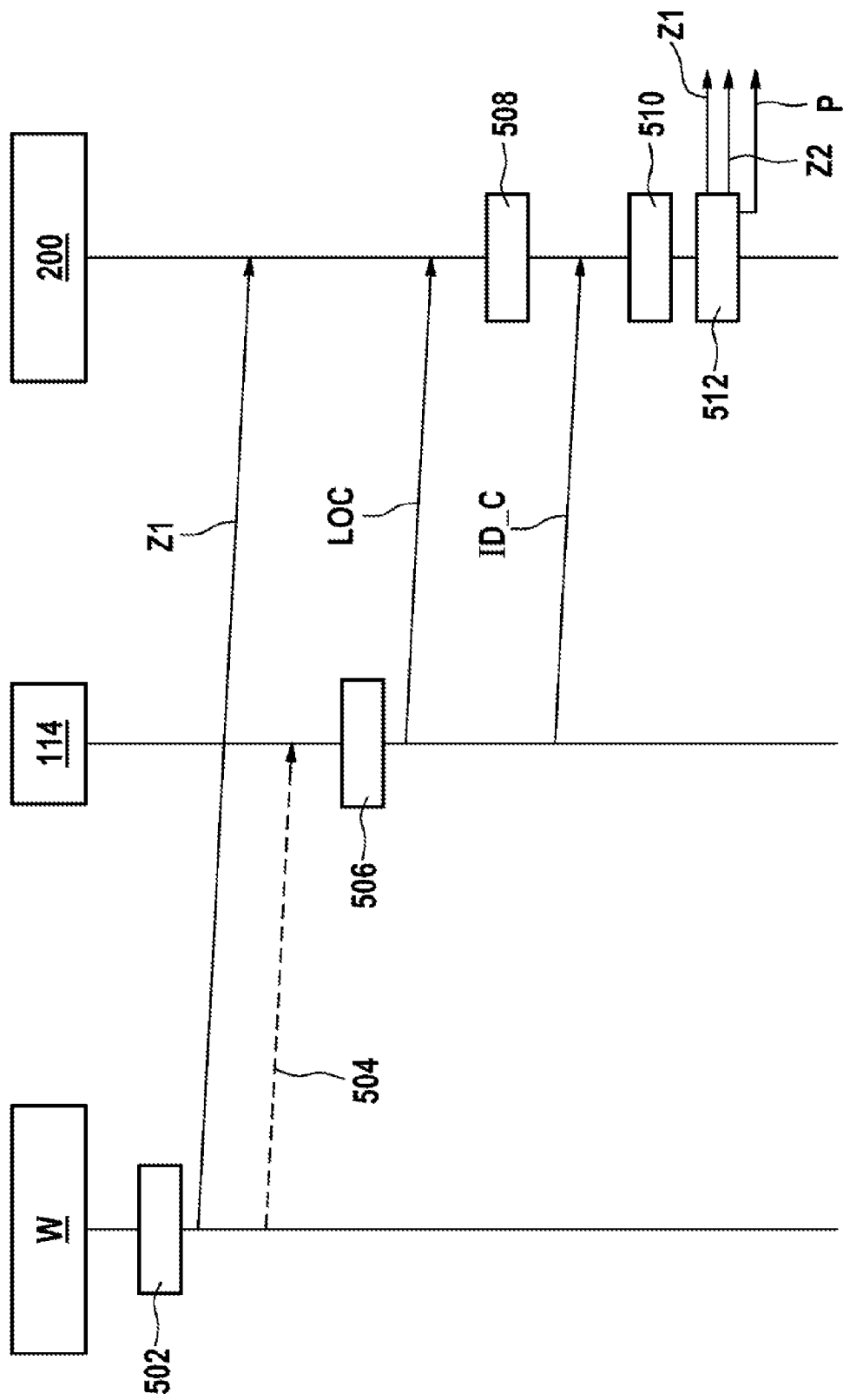
FIG. 2 shows a schematic sequence diagram.

FIG. 2 shows a schematic sequence diagram. The different plant W or an external supplier manufactures the production parts in a step 502, wherein the production parts are packed into the containers C from FIG. 1. In a step 504, the plurality of containers are supplied and are fed to the pairing area 114 before being checked into the production supermarket. The first allocation Z1 of the at least one production part type and the number of production parts to one of a plurality of containers is further received by the device 200.

In a step 506, the determination of the second allocation Z2 of at least one of the plurality of containers to one of the plurality of floor-bound trolleys begins in the pairing area 114. The locating signal LOC emanating from the terminal device of the trolley is thus transmitted to the device 200 which, depending thereon, determines the identifier of the trolley and its position in the pairing area 115 in a step 508. The identifiers of the containers in the pairing area 114 are further transmitted to the device 200. The received identifiers of the containers and the identifier of the trolley are linked in a step 510 to the second allocation Z2. The first allocation Z1, the second allocation Z2 and the position P are provided in a step 512.

Alternatively or additionally, the pairing can take place in a production line. In one example, the trolleys R11-R32 stand in a queue in a production line. An automatic introduction of empty trolleys D forms the queue. The production line knows how many parts of a specific type are packed into a respective container. The respective container C is allocated to the respective trolley R by means of the position P which is provided by the respective terminal device D, and at which the respective trolley R is loaded.

The invention claimed is:

1. A method for operating a production supermarket (100), wherein the method comprises:

receiving a first allocation (Z1) of at least one production part type and a number of production parts to at least one of a plurality of containers (C);

determining a second allocation (Z2) of at least one of the plurality of containers (C) to one of a plurality of floor-bound trolleys (R);

receiving, at a first antenna, a second antenna, and a third antenna, a locating signal (LOC) emanating from a terminal device (D) connected to the trolley (R) as the trolley passes through a pairing area (110);

determining a position (P) of the trolley of the second allocation (Z2) depending on the locating signal (LOC); and providing the first allocation (Z1), the second allocation (Z2) and the position (P).

2. The method as claimed in claim 1, wherein determining the second allocation (Z2) comprises:

determining an identifier of the trolley which is located in the pairing area (110) based on the locating signal (LOC);

detecting a plurality of identifiers of the containers (C) which are disposed on the trolley (R) passing through the pairing area (110); and providing the second allocation (Z2) comprising the determined identifier of the trolley and the plurality of determined identifiers of the containers (C).

3. The method as claimed in claim 2, wherein the identifier of the trolley (R) is determined in the pairing area (110) depending on the locating signal (LOC).

4. The method as claimed in claim 2, wherein each of the plurality of containers (C) is equipped with a respective RFID transponder, wherein the respective identifier of the containers (C) located on the trolley is captured by means of an RFID reading device (112) in the pairing area (110).

5. The method as claimed in claim 1, wherein the method comprises:

determining a row (L1; L2; L3) in which the trolley is arranged in the production supermarket (100) depending on the position (P); and providing the first allocation (Z1), the second allocation (Z2) and the row (L1; L2; L3).

6. The method of claim 1, wherein the trolley is a floor-bound trolley (R) for the production supermarket (100), the trolley (R) includes:

a plurality of non-driven wheels;

an accommodation section for accommodating containers (C);

the terminal device (D) which comprises at least one communication module (CM-D) and at least one antenna (A-D), and which is configured:

to transmit, as the trolley passes through the pairing area (110), a trolley identifier as the locating signal (LOC) for determining the position (P) of the trolley (R) using triangulation.

7. A device (200) for operating a production supermarket (100), wherein the device (200) comprises a processor (P-200), a memory (M-200) with computer program code (C-200), a communication module (CM-200) and a first antenna (A-200), a second antenna, and a third antenna, wherein the computer program code (C-200) is configured in such a way that, together with the processor (P-200), the communication module (CM-200) and the first antenna (A-200), the second antenna, and the third antenna, it has the effect that the device (200):

receives a first allocation (Z1) of at least one production part type and a number of production parts to at least one of a plurality of containers (C);

determines a second allocation (Z2) of at least one of the plurality of containers (C) to one of a plurality of floor-bound trolleys (R);

receives, at the first antenna, the second antenna, and the third antenna, a locating signal (LOC) emanating from a terminal device (D) connected to the trolley (R) as the trolley passes through a pairing area (110);

determines a position (P) of the trolley (R) of the second allocation (Z2) depending on the received locating signal (LOC); and provides the first allocation (Z1), the second allocation (Z2) and the position (P).

8. A system comprising:

a device (200) for operating a production supermarket (100), wherein the device (200) comprises a processor (P-200), a memory (M-200) with computer program code (C-200), a communication module (CM-200) and a first antenna (A-200), a second antenna, and a third antenna, wherein the computer program code (C-200) is configured in such a way that, together with the processor (P-200), the communication module (CM-200) and the first antenna (A-200), the second antenna, and the third antenna, it has the effect that the device (200):

receives a first allocation (Z1) of at least one production part type and a number of production parts to at least one of a plurality of containers (C);

determines a second allocation (Z2) of at least one of the plurality of containers (C) to one of a plurality of floor-bound trolleys (R);

receives, at the first antenna, the second antenna, and the third antenna, a locating signal (LOC) emanating from a terminal device (D) connected to the trolley (R) as the trolley passes through a pairing area (110);

determines a position (P) of the trolley (R) of the second allocation (Z2) depending on the received locating signal (LOC); and provides the first allocation (Z1), the second allocation (Z2) and the position (P), and wherein each of the plurality of trolleys (R) comprises:

a plurality of non-driven wheels;

an accommodation section for accommodating containers (C);

a wireless terminal device (D) which comprises at least one communication module (CM-D) and at least one antenna (A-D), and which is configured:

to transmit a locating signal (LOC) for determining a position (P) of the trolley (R).

* * * * *